United States Patent [19]
DeCaro

[11] 3,804,142
[45] Apr. 16, 1974

[54] TIRE STUD

[75] Inventor: Charles J. DeCaro, Chesterland, Ohio

[73] Assignee: Textron, Inc., Providence, R.I.

[22] Filed: Mar. 26, 1973

[21] Appl. No.: 344,721

Related U.S. Application Data

[62] Division of Ser. No. 238,164, March 27, 1972, Pat. No. 3,749,146.

[52] U.S. Cl................................ 152/210, 29/191.2
[51] Int. Cl.............................................. B60c 11/16
[58] Field of Search............... 152/210; 29/191.2; 264/111, 112

[56] References Cited
UNITED STATES PATENTS 3,717,189  2/1973  Gutshall.............................. 152/210
3,715,999  2/1973  Shwayder........................... 29/191.2
3,407,861  10/1968  Hildebrandt....................... 152/210

Primary Examiner—M. Henson Wood, Jr.
Assistant Examiner—D. W. Keen
Attorney, Agent, or Firm—Webb, Burden, Robinson & Webb

[57] ABSTRACT

An improved tire stud including a head portion and a shank portion is closed by a relatively thin end portion. A blind bore extends from an opening in the head portion through the shank to the end portion. Bonded particulate abrasive material fills at least a part of the bore adjacent the end portion. A method for making the tire stud is disclosed.

3 Claims, 3 Drawing Figures

PATENTED APR 16 1974 3,804,142

TIRE STUD

This is a division, of application Ser. No. 238,164, filed Mar. 27, 1972 now U.S. Pat. No. 3,749,146.

The invention relates to tire studs, and particularly to tire studs which include a surface-contacting particulate abrasive material.

Evolution of the art of tire studs has been from a simple article having a solid metal head and shank portion, like a rivet, to studs having a hollow end portion in which solid or particulate wear-resistant abrasive material has been placed. Where solid material has been used, it has been introduced, usually by press-fitting, into a blind bore in the shank portion through an opening in the end portion of the stud opposite the head portion. In some cases, however, a through bore has been provided in the stud, e.g., U.S. Pat. No. 3,230,997.

Recently, particulate abrasive material such as silicon and tungsten carbide, has been suggested as a suitable material for tire studs. It has been proposed to introduce the particulate material into a blind bore in the shank portion extending from an opening in the end of the stud opposite the head portion and bond the material to the shank with a matrix of metal or adhesive. Such an article, it is claimed, avoids the undesirable penetration of the tire stud into a road surface which tends to pock and ruin the surface. Tire studs of this type, however, are difficult to make since the particulate material tends to gather near the end away from the road surface. Thus, any variations in the volume of carbide and/or matrix material will result in (1) either an "over-fill" which will cause the matrix and/or carbide to protrude beyond the tire stud body, which in turn causes the tire stud, as installed on the tire, to exceed the amount of protrusion desired to minimize road wear, or (2) an "under-fill" condition which would cause the tire stud to be ineffective as a road gripping device until such a time as the tire wears to the point that the matrix-carbide matter becomes exposed.

Further, a solid "rivet-type" body with a cavity appropriate to the desired volume of matrix-carbide material will weigh more than my design having an equivalent volume of carbide-matrix matter and, thus, the solid "rivet-type" body impacts the road with greater force, which in turn tends to increase road wear.

In the previously known tire stud employing particulate matter, the volume occupied by the matrix in the unmelted phase is substantially greater than that after melting and the matrix must extend a significant distance beyond the opening of the rivet, making the loading procedure more complicated and costly. Because of this the use of matrix materials which are available in powder is impractical.

Further, with the matrix material so protruding, it is difficult to insure that upon melting all of the matrix material will enter the rivet and not spill over the sides of the rivet. When this results, not only is the matrix to abrasive material ratio adversely affected, but the spilled over matrix will accumulate on the underside of the head greatly increasing the radius between the head and shank, thus increasing the ease with which the tire stud is removed from the tire. My tire stud eliminates these aforementioned problems and lends itself to a number of bonding materials and bonding material forms.

My improved tire stud comprises a head portion and a shank portion closed at the end opposite the head portion by a relatively thin end portion. A blind bore extends from an opening in the head portion through the shank to the end portion. Particulate abrasive material, for example, carbides fills at least part of the bore near the end portion and is bonded in the bore by a metallic matrix.

In the following description, I have also set forth a preferred method for making my tire studs.

I have shown preferred embodiments of my improved tire stud and a means for making it in the accompanying drawings in which.

Figure 1:
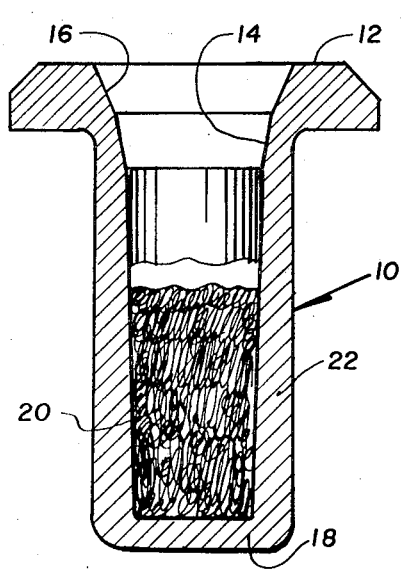
FIG. 1 is a sectional view of one form of my tire stud.

My preferred tire stud is primarily metal and has a shank portion 10. A head portion 12 is integrally formed with the shank portion by conventional techniques. A blind bore 14 extends from an opening 16 through head portion 10 and shank portion 12 terminating at end 18 opposite the head portion. The opening 16 may be conventional, counterbored or chamfered, as shown in FIG. 1, or it may be smoothly curved as shown in FIG. 2.

Figure 2:
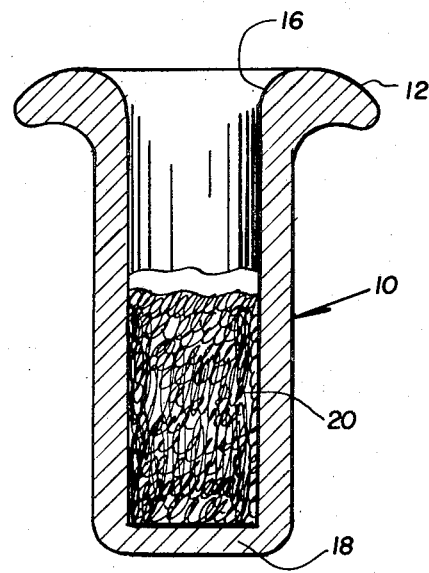
FIG. 2 is a sectional view of a second form of my tire stud.

The bore 14 may be cylindrical through its length, FIG. 2, or it may be slightly tapered from the opening 16 toward the opposite end 18, FIG. 1. The bore is preferably circular in cross-section; however, any other cross-sections can be employed.

Particulate abrasive material 20 fills at least a part of the bore 14 adjacent the end 18. The abrasive material 20 is bonded to each other and to the wall 22 of the shank portion by a binder material of metal or other suitable adhesive, such as epoxy or glue.

A feature of my improved tire stud is the relatively thin end 18 opposite the head portion of the tire stud. The thin end is designed to wear quickly and evenly once the stud contacts the road surface. When the end 18 is worn away, a predetermined amount of abrasive material is exposed to engage the road surface, thus providing more positive traction with less injury to the road surface than prior tire studs.

In my tire stud the thickness of the end 18 may vary from that of wall 20 of the shank portion. More specifically, it is preferred that end 18 be at least as thin as wall 20 and, as a minimum, is of a thickness just sufficient to retain particulate abrasive material within the tire stud during the manufacturing process. Optimally, the thickness of the end 18 is not greater than that which will be completely destroyed in only a few revolutions of a tire with my studs running on a dry road surface. The thickness profile of the end 18 may also vary depending on the manufacturing technique. The thin metal end 18 may be dome shaped to eliminate any "pointed" effect.

By way of illustration, the specific tire stud depicted in FIG. 1 is about 0.560 inch in length. The particulate material extends a distance of 0.325 inch from the closed end 18. The wall 22 of the shank portion is 0.022 inch in thickness and the end 18 likewise measures 0.022 inch in thickness. The stud diameter is about 0.195 inch along the shank portion and about 0.365 inch along the head portion.

Figure 3:
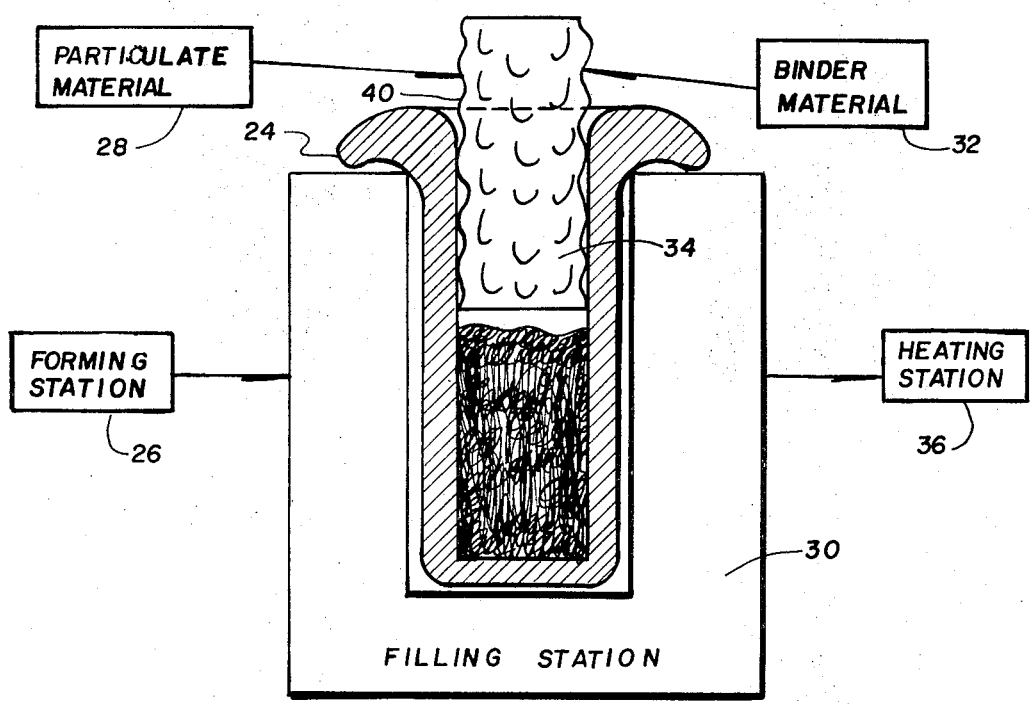
FIG. 3 is a schematic of a part of the means for making the tire stud.

During manufacture, the particulate abrasive material 20 is introduced into the preformed tire stud. Preferably, as shown in FIG. 3, the integral stud 24 comprising a shank portion with a closed end is moved from the forming station 26 to a particulate dispensing apparatus 28 at a filling station 30. Sufficient particulate material is gravity fed into the bore of the stud to fill it to the required volume.

A binder material, such as metal or adhesive, is then introduced into the bore of the tire stud 24 from apparatus 32. Preferably, the binder material is metal such as copper or nickel, and is placed in the bore above the particulate material in the form of a plug 34. The tire stud is then moved to a heating station such as furnace 36 where the binder material is melted causing it to fill the interstices between the particulate material and between the particulate material and the wall of the shank portion to form a strong bond. By utilizing the plug 34, the tire stud 24 can be transported prior to heating in the situation where it is necessary or desirable to braze at another location. The plug 34 may have an interrupted, discontinuous outer surface such as knurls 40 to permit the escape of any occluded gases formed during the heating process.

It is known that the impact to which a tire stud is subjected is a function of the mass of the stud. Thus, it is desirable to make the stud as light as possible without sacrificing strength. I have achieved this by making the plug of such a size that, when it is completely melted together with the particulate material it occupies a volume substantially less than the volume of the bore. More specifically, I have found that reduced impact is obtained while maintaining a strong bond between the particulate material and the wall of the bore where the bonded particulate material fills approximately 60 percent of the volume of the bore. Of course, if additional mass is desired, the plug may be of sufficient size that, after melting, the bonded particulate material alone or the bonded particulate material having a layer of plug material thereupon fills substantially the entire volume of the bore through the tire stud.

The amount of particulate material which is sufficient depends upon the ultimate use of the tire stud. In general, it is that amount required to provide abrasive material in the stud during the life of the tire in which the stud is used and which will provide a satisfactory density. Thus, with a reduced mass and a lesser volume than in present tire studs, the density of the particulate material can be maintained. Since it will usually be unnecessary to completely fill the bore of the stud with particulate material, it is apparent that there is potential for substantial economics in material and time in making my tire stud. Further, gravity filling of the particulate material causes it to pack properly in the tire stud at the closed end which contacts the road surface.

My improved tire stud may be mounted in a tire tread using conventional studding tools.

I claim:
1. A method of making a tire stud comprising:
   A. forming an article having a head portion and shank portion;
   B. providing a blind bore through the head and shank portion terminating in an end opposite the head portion;
   C. feeding a particulate abrasive material into the bore to fill at least a part of the volume of the bore;
   D. positioning a plug of binder material into said bore above the abrasive material; and
   E. heating said plug to bond the particulate material together and to the wall of the bore.

2. The method of claim 1 wherein step D includes positioning a copper plug into said bore.

3. A method of claim 1 whereas said copper plug has an interrupted, discontinuous surface to permit the escape of occluded gases during the heating step.

* * * * *